(12) United States Patent
Moman et al.

(10) Patent No.: US 6,413,901 B1
(45) Date of Patent: Jul. 2, 2002

(54) HIGHLY ACTIVE, SUPPORTED ZIEGLER-NATTA CATALYST SYSTEMS FOR OLEFIN POLYMERIZATION, METHODS OF MAKING AND USING THE SAME

(75) Inventors: Akhlaq Moman; Atieh Abu-Raqabah; Navin Nallaveerapan, all of Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 09/581,327

(22) PCT Filed: Oct. 13, 1999

(86) PCT No.: PCT/EP99/07784

§ 371 (c)(1),
(2), (4) Date: Jun. 9, 2000

(87) PCT Pub. No.: WO00/23480

PCT Pub. Date: Apr. 27, 2000

Related U.S. Application Data

(60) Provisional application No. 60/104,669, filed on Oct. 16, 1998.

(51) Int. Cl.⁷ ............ B01J 31/00; B01J 37/00; C08F 4/02; C08F 4/60
(52) U.S. Cl. ......... 502/132; 502/133; 502/134; 502/108; 502/109
(58) Field of Search ............... 502/109, 132, 502/133, 134

(56) References Cited

U.S. PATENT DOCUMENTS

| | | | |
|---|---|---|---|
| 3,787,384 A | 1/1974 | Stevens et al. |
| 4,173,547 A | 11/1979 | Graff |
| 4,568,730 A | 2/1986 | Graves |
| 4,876,229 A | 10/1989 | Furtek |
| 4,900,706 A | 2/1990 | Sasaki et al. |
| 4,940,682 A | 7/1990 | Sasaki et al. |
| 4,983,694 A | 1/1991 | Furtek |
| 5,006,618 A | 4/1991 | Miro |
| 5,118,648 A | 6/1992 | Furtek et al. |

FOREIGN PATENT DOCUMENTS

| | | |
|---|---|---|
| FR | 1529845 | 11/1968 |
| WO | WO 97/48742 | 12/1997 |

*Primary Examiner*—Mark L. Bell
*Assistant Examiner*—J. Pasterczyk
(74) *Attorney, Agent, or Firm*—Kramer Levin Naftalis & Frankel

(57) ABSTRACT

A catalyst composition for alpha olefin polymerization is provided. The catalyst composition is prepared by a process including treating PVC containing particles with an organomagnesium compound in an inert solvent, contacting the treated PVC containing particles with a transition metal compound from the group $TiCl_4$, $VCl_4$ or $ZrCl_4$, in the absence of an electron donor, and activating the product particles with a cocatalyst. An organoaluminum compound can also be mixed with the organomagnesium compound prior to treating the PVC containing particles.

29 Claims, No Drawings

HIGHLY ACTIVE, SUPPORTED ZIEGLER-NATTA CATALYST SYSTEMS FOR OLEFIN POLYMERIZATION, METHODS OF MAKING AND USING THE SAME

This application claims priority from provisional appl. Ser. No. 60/104,669, filed Oct. 16, 1998.

BACKGROUND OF THE INVENTION

1. Field of the Invention

This invention relates to new transition metal-based supported olefin polymerization catalyst systems, novel methods of producing such catalysts and methods of polymerizing alpha-olefins to provide polyolefins, and preferably high density polyethylene and linear low density polyethylene. More particularly, this invention relates to the preparation of ultra high active catalyst compositions comprising at least a transition metal compound, a magnesium-containing compound and a polymeric material.

2. Description of the Prior Art

Several publications are referenced in this application. These references describe the state of the art to which this invention pertains, and are incorporated herein by reference.

The field of olefin polymerization catalysis has witnessed many remarkable discoveries during the last 50 years. In particular, two broad areas of invention stand out. Firstly, the discovery of Ziegler-Natta catalysts in the 1950's, which are still being used extensively in the polyolefins industry. Secondly, and more recently, the discovery of the highly active metallocene-based catalysts. Since the discoveries of these systems, extensive research work was conducted in order to improve their performance.

However, despite the progress in these areas, there are still certain limitations as recognized by those of ordinary skill in the art. For example, conventional Ziegler-Natta catalysts often display limited activity, which reflects on the high catalyst residues. On the other hand, the metallocene-based catalysts intrinsically possess high activity, though the catalyst precursors and, in particular, the cocatalysts required for polymerization, such as aluminoxanes or borane compounds, are very expensive. Further, another limitation that both catalyst systems share is the lengthy method of preparation.

Traditionally, the active components of both Ziegler-Natta and metallocene catalysts are supported on the inert carriers to enhance the catalyst productivity and improve and control the product morphology. Magnesium chloride and silica have predominantly been used for the preparation of supported olefin polymerization catalysts. U.S. Pat. No. 4,173,547 to Graff describes a supported catalyst prepared by treating a support, for example silica, with both an organoaluminum and an organomagnesium compound. The treated support was then contacted with a tetravalent titanium compound. In a simpler method, U.S. Pat. No. 3,787,384 to Stevens et al. discloses a catalyst prepared by first reacting a silica support with a Grignard reagent and then combining the mixture with a tetravalent titanium compound.

However, procedures typically used for the preparation of suitable magnesium chloride and silica supports such as spray drying or re-crystallization processes are complicated and expensive.

Hence, all methods described in the aforementioned patents of catalyst preparation present the inconvenience of being complicated, expensive and do not allow consistency of particle size and particle size distribution. Also, despite the extensive and increasing use of the described supports for Ziegler-Natta catalysts, the support materials themselves have several deficiencies. For example, in the case of silica, high calcination temperatures are required to remove water, which is a common catalyst poison. This represents a significant proportion of the preparation of the catalyst. The use of silica as a support results in the support remaining largely in the product, which can affect the product properties, such as optical properties, or processing.

Certain polymeric materials have also been used for supporting titanium and magnesium compounds. However, most of the polymeric supports used so far have been based on polystyrene or styrene-divinylbenzene copolymers. U.S. Pat. No. 5,118,648 to Furtek and Gunesin describe a catalyst prepared using styrene-divinylbenzene as a polymeric support. The preparation of the catalyst was carried out by suspending the polymeric support in a solution of a magnesium dihalide or a magnesium compound capable of being transformed into a magnesium dihalide, for example, by titanium tetrachloride treatment, and subsequently evaporating the solvent. Hence, the active catalyst components were deposited on the polymeric support by physical impregnation. Other physical impregnation methods include that described by U.S. Pat. No. 4,568,730 to Graves whereby polymer resins of styrene-divinylbenzene are partially softened and the active catalyst components homogeneously mixed in the resin to form a mass, which was subsequently pelletized or extruded into catalyst particles. However, the activity of the above-described polymer supported catalysts is not significantly higher than that of silica-based Ziegler-Natta catalysts.

Polypropylene and polyethylene have also found use as polymeric supports where the polymeric material is typically ground with the catalyst components, which represents a difficult and complicated catalyst preparation procedure. In addition, there remains a significant concern as to the ability of the support material to retain the active species, deposited by physical impregnation, during polymerization conditions and thus generate, for example, fines. Hsu et al., Journal of Polymer Science: Part A: Polymer Chemistry, Vol. 32, 2135 (1994), has used poly(ethylene-co-acrylic acid) as a support for Ziegler-Natta catalysts. Though, the catalyst activity was found to be similar to that of the magnesium chloride supported catalyst.

SUMMARY OF THE INVENTION

The present invention provides ultra highly active supported olefin polymerization catalysts comprising at least one transition metal compound, at least one magnesium compound and defined polymer particles. The polymer particles used in catalyst preparation have a mean particle diameter of 5 to 1000 $\mu$m and a pore volume of at least 0.1 cm$^3$/g and a pore diameter of at least from 20 to 10,000 angstroms, preferably from 500 Å to 10,000 Å and a surface area of from 0.1 m$^2$/gm to 100 m$^2$/gm, preferably from 0.2 m$^2$/gm to 15 m$^2$/gm.

DETAILED DESCRIPTION OF THE INVENTION

One aspect of the invention relates to improved catalyst systems. The solid catalyst component (catalyst precursor) used in the present invention contains at least a transition metal compound, at least a magnesium compound, and a polymeric material having a mean particle diameter of 5 to 1000 $\mu$m, a pore volume of 0.1 cm$^3$/g or above and a pore diameter of 20 to 10,000 angstroms, preferably from 500 Å to 10,000A and a surface area of from 0.1 m²/gm to 100 m²/gm, preferably from 0.2 m2/gm to 15 m²/gm.

The transition metal compound used for the synthesis of the solid catalyst component in the invention is represented by the general formula $M(OR^1)_nX_{4-n}$, wherein M represents a transition metal of Group 4, 5, 6, 7 or 8–10 of the Periodic Table of the elements, $R^1$ represents a hydrocarbon having 1 to 20 carbon atoms, X represents a halogen atom and n represents a number satisfying $0 \leq n \leq 4$. Nonlimiting examples of the transition metal are titanium, vanadium, or zirconium. Examples of $R^1$ include alkyl groups such as methyl, ethyl, n-propyl, isopropyl, n-butyl and the like.

Preferred examples of the above mentioned compounds include the following: titanium tetrachloride, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride, vanadium trichloride, vanadium tetrachloride, vanadium oxytrichloride, and zirconium tetrachloride.

The magnesium compounds used for the catalyst synthesis in the invention include Grignard compounds represented by the general formula $R^2MgX$, wherein $R^2$ is a hydrocarbon group of 1 to 20 carbon atoms and X is a halogen atom. Other preferred magnesium compounds are represented by the general formula $R^3R^4Mg$, wherein $R^3$ and $R^4$ are each a hydrocarbon group of 1 to 20 carbon atoms.

Preferred examples of the above mentioned compounds include the following: diethylmagnesium, dibutylmagnesium, butylethylmagnesium, dihexylmagnesium, ethylmagnesium chloride, butylmagnesium chloride, hexylmagnesium chloride and the like.

These magnesium compounds described above may also be used in catalyst preparation as a mixture with an organoaluminum compound. Examples of the organoaluminum compounds include trialkylaluminum such as trimethylaluminium, triethylaluminum, triisobutylaluminum, trihexylaluminum and the like; and alkylalumoxanes such as methylalumoxane, ethylalumoxane and the like. The mixture of the magnesium compound and the organoaluminum compound in this invention can be used with a Mg:Al molar ratio of 99:1 to 50:50, and preferably 98:2 to 80:20 and more preferably 96:4 to 85:15.

The polymer particles used in the present invention are in the form of distinct spherical particles, on which the active catalyst component is chemically bonded, wherein the ratio of active catalyst component to polymeric support is less than 1% by weight, preferably less than 0.7% by weight. In contrast, catalysts prepared in the prior art using polymeric materials relied on physical impregnation of the catalyst active sites on the polymeric materials.

The polymer particles used in the present invention have a spherical shape with a particle diameter of 5 to 800 μm, preferably 10 to 600 μm, and more preferably 15 to 500 μm, a pore diameter of 20 to 10,000 angstroms preferably from 500 Å to 10,000 Å, a surface area of from 0.1 m²/gm to 100 m²/gm, preferably from 0.2 m²/gm to 15 m²/gm and a pore volume of 0.1 cm³/g or above, preferably 0.2 cm³/g or above. Uniformity of particle size is not critical and in fact catalyst supports having nonuniform particle sizes are preferred. By way of example and not limitation, for a catalyst support having a median particle size of 65 microns, it is preferred that at least 10% of the support particles have a diameter of greater than 85 microns, and at least 10% of the support particles have a diameter of less than 45 microns.

Examples of the polymeric particles used as supports in the catalyst preparation of the present invention include thermoplastic polymers. Polymer particles of polyvinyl chloride are preferred, and non-crosslinked polyvinyl chloride particles are most preferred.

The polymer particles used in the present invention have surface active sites such as labile chlorine atoms. Preferably, these active sites are reacted stoichiometrically with the organometallic compound, namely a magnesium and/or aluminum containing compound.

The use of the polymer particles mentioned in this invention in catalyst preparation offers significant advantages over traditional olefin polymerization catalysts using supports such as silica or magnesium chloride. In comparison to the silica-supported catalyst, the polymer particles described in catalyst preparation of the invention require no high temperature and prolonged dehydration steps prior to their use in catalyst synthesis, thereby simplifying the synthesis process and thus reducing the overall cost of catalyst preparation. Furthermore, the cost of the polymeric support used in the present invention is substantially cheaper than silica or magnesium chloride supports. In addition, the catalyst in the present invention uses significantly lower levels of catalyst precursors for catalyst preparation than silica or magnesium chloride supported catalysts. Also, the catalyst in the present invention is more active than conventional silica or magnesium supported Ziegler-Natta catalysts and some supported metallocene catalysts. It has been unexpectedly found that the catalyst compositions of the present invention has an activity of more than 60,000 g polyethylene per mmol of titanium per 100 psi per hour, thereby providing polymers of superior clarity having a melt flow ratio from 15 to 60.

According to one embodiment, a polyvinyl chloride support is used. The synthesis of the solid catalyst component in the present invention involves introducing the polymeric material described above into a vessel and then adding a diluent. Suitable diluents include isopentane, hexane, cyclohexane, heptane, isooctane and pentamethylehptane. The polymeric material is then treated with either a magnesium compound described above or a mix of a magnesium compound and aluminum compound of the type described above at a temperature in the range of 20° C. to 150° C., preferably 50° C. to 110° C. The ratio of organometallic compound to the polymer support can be in the range of 0.05 mmol–20 mmol per gram polymer, preferably, 0.1 mmol to 10 mmol per gram polymer, and more preferably 0.2 mmol to 2 mmol gram polymer.

The excess or unreacted magnesium compound or mix of the magnesium compound and the aluminum compound is removed by washing several times. Suitable solvents for washing purposes include iso-pentane, hexane, cyclohexane, heptane, isooctane and pentamethylheptane. The magnesium or magnesium-aluminum modified polymeric material is then treated with a transition metal compound of the type described above at a temperature in the range of 20° C. to 150° C., preferably 50° C. to 110° C. According to this invention, $TiCl_4$, $TiCl_3$, $Ti(OC_2H_5)_3Cl$, $VCl_4$, $VOCl_3$, $ZrCl_4$, $ZrCl_3(OC_2H_5)$ are preferred transition metal $TiCl_4$ and $ZrCl_4$ are more preferred. The produced solid catalyst component is then washed with a suitable solvent such as isopentane, hexane cyclohexane, heptane, isooctane and pentamethylheptane, preferably isopentane or hexane. The solid catalyst component is then dried using a nitrogen purge at a temperature in the range of 20° C. to 100° C., preferably 30° C. to 80° C.

The catalyst composition of this invention is not subjected to halogenation, e.g., chlorination treatments. The thusformed catalyst component is activated with suitable activators, also known as co-catalysts or catalyst promoters. The preferred compounds for activation of the solid catalyst component are organoaluminum compounds.

The organoaluminum compounds which can be used in the present invention along with the solid catalyst component are represented by the general formulas $R^5{}_n AlX_{3-n}$ or $R^6R^7Al$—O—$AlR^8R^9$, where $R^5$, $R^6$, $R^7$, $R^8$ and $R^9$ each represent a hydrocarbon group having 1 to 10 carbon atoms; X represents a halogen atom and n represents a number satisfying $0 \leq n \leq 3$. Illustrative but not limiting examples of organoaluminum compounds include triethylaluminum, triisobutylaluminum, trihexylaluminum, diethylaluminum chloride, methylalumoxane, ethylalumoxane, and mixtures thereof. The organoaluminum compound in this invention can be used in the range of 1 to 1500 moles per one mole of transition metal in the said catalyst, and more preferably in the range of 50 to 800 moles per one mole of transition metal.

The catalyst described in the present invention can operate in polymerizing alphaolefins in solution, slurry and gas phase processes. A pressure in the range of 5 to 40 bars is suitable for the polymerization, more preferably 15 to 30 bars. Suitable polymerization temperatures are in the range of 30° C. to 110° C., preferably 50° C. to 95° C. In addition to polyethylene homopolymer, ethylene copolymers with $C_3$–$C_{10}$ alpha-olefins are readily prepared by the present invention. Particular examples include ethylene/propylene, ethylene/1-hexene, ethylene/1-butene and ethylene/1-octene. The molecular weight of the polymer can be effectively controlled by varying process conditions such as the hydrogen pressure used, as evidenced by the change in the melt index of the polymer produced. The catalyst compositions of the present invention are useful for olefin polymerization in the absence of electron donor compounds which are sometimes utilized to control the stereoselectivity of the catalyst during polymerization.

EXAMPLES

The following examples are intended to be illustrative of this invention. They are, of course, not to be taken to in any way limit the scope of this invention. Numerous changes and modifications can be made with respect to the invention.

Example 1

(A) Synthesis of Organomagnesium Compounds

A three-necked round bottom flask, equipped with a nitrogen inlet, a thermometer, a reflux condenser and a dropping funnel, was purged with nitrogen for 30 minutes at 110° C. and then 12 g of magnesium turnings were added to the flask. A crystal of iodine was added, followed by 225 cm³ of dibutylether. Then 53.0 cm³ of butylchloride was gradually added to the flask over a period of 45 minutes, while stirring and maintaining the temperature at 105 ° C. The resulting mixture in the flask was stirred for 90 minutes after the completion of the butylchloride addition at 105° C. Then 400 cm³ of n-heptane was added and stirring was carried out for a further 90 minutes at 105° C. The reaction mixture was cooled to room temperature, and the solid matter was filtered off.

A sample of the butylmagnesium chloride solution was analyzed using a Mettler Autotitrator. Thus, the concentration of n-butylmagnesium chloride was determined to be 0.68 M.

(B) Synthesis of the Magnesium Modified Polyvinylchloride

In a three-necked round bottom flask, equipped with a condenser and stirrer, was placed 5.0 g of polyvinylchloride (supplied by SABIC, Saudi Arabia) spheres of 103 μm average particle size. The flask containing the polyvinylchloride was heated up to 70° C. using an oil bath and then evacuated at 30 mm Hg pressure for 30 minutes. The flask and its content were then purged with dried nitrogen and the polyvinylchloride was slurried using 30 cm³ of heptane. Then 15.4 cm³ of a mixture of butylmagnesium chloride and triethylaluminum, with a magnesium to aluminum ratio of 90 to 10, was added to the slurry at 70° C. and the resultant mixture was stirred for 60 minutes at 70° C. The stirring was then stopped and the supernatant liquid was removed by cannula. The resulting solid was washed by stirring with 100 cm³ of heptane and then removing the solvent by cannula, and the washing step was repeated with a further 100 cm³ of heptane.

(C) Synthesis of Solid Catalyst Component

Then the modified polyvinylchloride was slurried using 30 cm³ of heptane, and stirred with 10 cm³ of a one molar titanium tetrachloride solution in heptane at 70° C. for 60 minutes. The supernatant liquid was decanted and the resulting solid product was washed by stirring with 100 cm³ of heptane and then removing the heptane, and then washed again with 100 cm³ of isopentane, and then washed three times with 75 cm³ of isopentane. Finally, the solid catalyst was dried using a nitrogen purge for thirty minutes to yield a free-flowing brown colored solid product.

The solid catalyst component was analyzed by atomic absorption spectroscopy and was found to contain 0.2% by weight of titanium atoms, 1.0% by weight of magnesium atoms and 0.05% by weight aluminum.

Examples 2–5

Influence of TEAL Concentration on Ethylene Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then the desired quantity of triethylaluminum, described in Table 1, was introduced to the reactor, followed by 0.1 g of the solid catalyst described in Example 1. The reactor temperature was raised to 80° C. and the hydrogen pressure was then adjusted until the pressure reached 3 bars. Ethylene was introduced to the reactor such as to raise the reactor pressure to 15 bar, and the polymerization was carried out for 1 hour, with ethylene supplied on demand to maintain the total reactor pressure at 15 bar. Results are described in Table 1.

TABLE 1

Influence of TEAL Concentration

| Example | Amount of TEAL/mmol | Yield/ g PE | Activity/ (g PE/mmol Ti.hr. 100 psi) | Mw |
|---|---|---|---|---|
| 2 | 1.2 | 160 | 21915 | 142 000 |
| 3 | 1.8 | 267 | 36909 | 122 000 |
| 4 | 2.4 | 273 | 37486 | 121 000 |
| 5 | 3.0 | 249 | 34602 | 117 000 |

Examples 6–8

Influence of Hydrogen on Ethylene Polymerization

An autoclave with a volume of 2 liters was purged with nitrogen at 180° C. to 30 minutes. After cooling the autoclave to 60° C., one liter of hexane was introduced to the reactor, followed by purging with hydrogen. Then 2 mmol of triethylaluminum, followed by 0.1 g of the solid catalyst described in Example 1 were introduced to the reactor. The reactor temperature was raised to 80° C. and the hydrogen pressure was then adjusted until the pressure reached that described in Table 2. Ethylene was introduced to the reactor to raise the reactor pressure to 15 bar, and polymerization was carried out for 1 hour, with ethylene supplied as needed to maintain the total reactor pressure at 15 bar. Results are described in Table 2.

TABLE 2

| Example | Amount of Hydrogen/bar | Yield/ g PE | Activity/ (g PE/mmol Ti.hr. 100 psi) | Mw |
|---|---|---|---|---|
| 6 | 3 | 267 | 36909 | 122 000 |
| 7 | 2.4 | 288 | 37284 | 143 000 |
| 8 | 1.4 | 364 | 43589 | 204 000 |

Examples 9–11

Influence of Butene Concentration on Ethylene Polymerization

An autoclave with a volume of 2 liters was purged with nitrogen at 180° C. for 30 minutes. After cooling the autoclave to 60° C., one liter of hexane was introduced to the reactor followed by purging with hydrogen. Then 1.8 mmol of triethylaluminum, followed by 0.06 g of the solid catalyst described in Example 1 were introduced to the reactor. The reactor temperature was raised to 80° C. and the hydrogen pressure was then adjusted until the pressure reached 1.4 bar. Butene was then introduced to the reactor in the amount described in Table 3. Ethylene was introduced to the reactor such as to raise the reactor pressure to 15 bar, and polymerization was carried out for 1 hour, with ethylene supplied as needed to maintain the total reactor pressure at 15 bar. Results are described in Table 3.

TABLE 3

| Example | Amount of Butene/cm$^3$ | Yield/ g PE | Activity/ (g PE/mmol Ti.hr. 100 psi) | Mw |
|---|---|---|---|---|
| 9 | 5 | 224 | 44707 | 197 000 |
| 10 | 10 | 238 | 47501 | 187 000 |
| 11 | 20 | 194 | 38720 | 162 000 |

Example 12

(A) Synthesis of the Magnesium Modified Polyvinylchloride

In a three-necked round bottom flask, equipped with a condenser and stirrer, was placed 5.0 g of polyvinylchloride (supplied by SABIC, Saudi Arabia) spheres of 103 μm average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm$^3$ of heptane, then 20 cm$^3$ of butylmagnesium chloride was added to the slurry at 70° C. and the resultant mixture was stirred for 60 minutes at 70° C. The stirring was then stopped and the supernatant liquid was removed by cannula. The resulting solid was washed by stirring with 100 cm$^3$ of heptane and then removing the solvent by cannula, and the washing step was repeated with a further 100 cm$^3$ of heptane.

(B) Synthesis of Solid Catalyst Component

The magnesium-modified polyvinylchloride was slurried using 30 cm$^3$ of heptane, and stirred with 10 cm$^3$ of a one molar titanium tetrachloride solution in heptane at 70° C. for 60 minutes. The supernatant liquid was decanted and the resulting solid product was washed by stirring with 100 cm$^3$ of heptane and then removing the heptane, and then washing again with 100 cm$^3$ of isopentane, and then washing three times with 75 cm$^3$ of isopentane. Finally, the solid catalyst was dried using a nitrogen purge for thirty minutes to yield a free-flowing brown colored solid product. The solid catalyst component was found to contain 0.1% by weight of titanium atoms, 0.5% by weight of magnesium atoms.

Example 13

Ethylene Polymerization

An autoclave with a volume of 2 liters was purged with nitrogen at 180° C. for 30 minutes. After cooling the autoclave to 60° C., one liter of hexane was introduced to the reactor followed by purging with hydrogen. Then 2.0 mmol of triethylaluminum, followed by 0.1 g of the solid catalyst described in Example 12 were introduced to the reactor. The reactor temperature was raised to 80° C. and the hydrogen pressure was adjusted until the pressure reached 3.0 bars. Ethylene was introduced to the reactor such as to raise the reactor pressure to 15 bar, and polymerization was carried out for 1 hour, with ethylene supplied as needed to maintain the total reactor pressure at 15 bar. 182 grams of polyethylene were recovered. The catalyst activity was found to be 49,808 g PE/mmol Ti hr. 100 psi.

Example 14

Comparative

This is a comparative example using silica supported conventional Ziegler-Natta catalyst. The ethylene polymerization procedure used for this example was the same as that described in Example 13 except that 0.287 g of silica supported conventional Ziegler-Natta catalyst based on TiCl$_3$/THF/MgCl$_2$ (0.06 mmol Ti) complex was used and activated with 3.0 mmol of triethyl aluminum. 182 grams of polethylene were recovered having a weight average molecular weight (Mw) of 178000. The catalyst activity was 1743 g PE/mmol Ti. 1 hr. 100 psi.

Example 15

Comparative

This is a comparative example using a silica supported metallocene catalyst. The ethylene polymerization procedure used for this example was the same as that described in Example 13 except that 0.04548 g of silica supported Cp$_2$ZrCl$_2$ metallocene catalyst (0.00133 mnol Zr) was used and activated with methyl alumoxane (MAO) at a molar ratio of Al/Zr of 800. The ethylene partial pressure was 8 bars, H$_2$ partial pressure 1.5 bars and reaction temperature was 70° C. 53 grams of polyethylene were recovered having a weight average molecular weight (Mw) of 95000. The catalyst activity was 28,929 g PE/mmol Zr. 1 hr. 100 psi.

The above description of the invention is intended to be illustrative and not limiting. Various changes or modifications in the embodiments described may occur to those skilled in the art. These can be made without departing from the spirit or scope of the invention.

What is claimed is:

1. A catalyst composition for alpha-olefin polymerization prepared according to a process consisting essentially of the sequential steps of:

(a) treating PVC containing particles with at least one organomagnesium compound in an inert organic solvent;

(b) contacting said treated PVC containing particles of (a) with a transition metal compound selected from the group consisting of $TiCl_4$, $VCl_4$ and $ZrCl_4$ in the absence of an electron donor; and (c) activating product particles of b) with a cocatalyst.

2. The catalyst composition of claim 1, wherein said transition metal compound is $TiCl_4$.

3. The catalyst composition of claim 2, wherein said PVC containing particles of (a) are contacted with said transition metal compound under conditions sufficient to form chemical bonding between said transition metal compound and said treated PVC containing particles.

4. A catalyst composition for alpha-olefin polymerization prepared according to a process comprising the sequential steps of:

(a) treating PVC containing particles with a mixture of an organomagnesium compound and an organoaluminum compound in an inert organic solvent;

(b) contacting said treated PVC containing particles of (a) with a transition metal compound selected from the group consisting of $TiCl_4$, $VCl_4$ and $ZrCl_4$ in the absence of an electron donor; and (c) activating product particles of b) with a cocatalyst.

5. The catalyst composition of claim 4, wherein said transition metal compound is $TiCl_4$.

6. The catalyst composition of claim 4, wherein said PVC containing particles of (a) are contacted with said transition metal compound under conditions sufficient to form chemical bonding between said transition metal compound and said treated PVC containing particles.

7. A catalyst composition of claim 4, wherein said mixture of said organomagnesium compound and said organoaluminum compound has a molar ratio of Mg:Al from 99:1 to 50:50.

8. An active catalyst composition for alpha-olefin polymerization consisting essentially of a transition metal compound having the formula $M(OR^1)_nX_{4-n}$, wherein M is a transition metal of Group 4, 5, 6, 7 or 8–10 of the periodic table of elements, $R^1$ is an alkyl group having 1 to 20 carbons, X is a halogen and n is a number satisfying 0<n<4, at least one organomagnesium compound, and at least one organoaluminum compound, wherein said active catalyst composition is chemically bonded onto a support comprised of PVC containing polymeric particles to form a supported catalyst system, and said active catalyst composition is less than 3% of the weight of the supported catalyst system.

9. The supported catalyst composition of claim 8, wherein said active catalyst composition is chemically bonded on to said support of PVC containing polymeric particles.

10. The supported catalyst composition of claim 8 wherein n=0.

11. A catalyst composition for alpha-olefin polymerization prepared according to a process consisting essentially of:

(a) treating PVC containing particles with at least one organomagnesium compound selected from the group consisting of diethylmagnesium, dibutylmagnesium, butylethylmagnesium, dihexyl magnesium, ethylmagnesium chloride, butylmagnesium chloride, hexylmagnesium chloride and mixtures thereof to form solid magnesium-modified PVC containing particles;

(b) slurrying said magnesium-modified PVC containing particles in an inert hydrocarbon solvent selected from the group consisting of isopentane, hexane, cyclohexane, heptane, isooctane, pentamethylheptane and mixtures thereof; and (c) adding to the slurry of (b) a transition metal compound selected from the group consisting of $TiCl_4$, $VCl_4$, and $ZrCl_4$ to form said catalyst composition.

12. A solid catalyst composition for alpha-olefin polymerization prepared according to a process comprising:

(a) treating PVC containing particles with a mixture of at least one organomagnesium compound and at least one organoaluminum compound to form magnesium and aluminum-modified PVC containing particles, wherein said organomagnesium compound is selected from the group consisting of diethylmagnesium, dibutylmagnesium, butylethylmagnesium, dihexylmagnesium, ethylmagnesium chloride, butylmagnesium chloride, hexylmagnesium chloride and mixtures thereof, and said organoaluminum compound is selected from the group consisting of trimethylaluminum, triethylaluminum, triisobutylaluminum, trihexylaluminum, methylalumoxane, ethylalumoxane and mixtures thereof;

(b) slurrying said magnesium and aluminum-modified PVC containing particles in an inert hydrocarbon solvent selected from the group consisting of isopentane, hexane, cyclohexane, heptane, isooctane, pentamethylheptane and mixtures thereof; and (c) adding to the slurry of (b) a transition metal compound selected from the group consisting of $TiCl_4$, $VCl_4$, and $ZrCl_4$ to form said catalyst composition.

13. The catalyst composition of claim 12, wherein said mixture of said organomagnesium compound and said organoaluminum compound has a molar ratio of Mg:Al from 99:1 to 50:50.

14. The catalyst composition of claim 1, wherein the PVC containing particles have a mean particle diameter of 5 to 800 μm, a pore volume of at least 0.1 $cm^3$/g and a pore radius of 500 to 10,000 angstroms.

15. The catalyst composition of claim 4, wherein the PVC containing particles have a mean particle diameter of 5 to 800 μm, a pore volume of at least 0.1 $cm^3$/g and a pore radius of 500 to 10,000 angstroms.

16. The catalyst composition of claim 1, wherein the PVC containing particles have a mean particle diameter of 5 to 800 μm, a pore volume of at least 0.1 $cm^3$/g and a pore radius of 500 to 10,000 angstroms and the PVC containing particles have a molecular weight in the range of 5,000 to 200,000 g/mole.

17. The catalyst composition of claim 4, wherein the PVC containing particles have a mean particle diameter of 5 to 800 μm, a pore volume of at least 0.1 $cm^3$/g and a pore radius of 500 to 10,000 angstroms, and the PVC containing particles have a molecular weight in the range of 5,000 to 200,000 g/mole.

18. The catalyst composition of claim 1, wherein the organomagnesium compound is represented by the general formula $R^2MgX$, wherein $R^2$ is a hydrocarbon group of 1 to 20 carbon atoms and X is a halogen atom or $R^3R^4Mg$ wherein $R^3$ and $R^4$ are each a hydrocarbon group having 1 to 20 carbon atoms.

19. The catalyst composition of claim 4, wherein the organomagnesium compound is represented by the general formula $R^2MgX$, wherein $R^2$ is a hydrocarbon group of 1 to 20 carbon atoms and X is a halogen atom or $R^3R^4Mg$ wherein $R^3$ and $R^4$ are each a hydrocarbon group having 1 to 20 carbon atoms.

20. The catalyst composition of claim 4, wherein the organoaluminum compound is represented by the general formula $AlR^{10}{}_3$ (wherein $R^{10}$ is a hydrocarbon group of 1 to 20 carbon atoms), or $AlR^{11}{}_2X$ (wherein $R^{11}$ is a hydrocarbon group of 1 to 20 carbon atoms and X is a halogen atom).

21. The catalyst composition of claim 3, wherein the catalyst composition is obtained by treating the PVC containing particles with said organomagnesium compound at a temperature in the range of 20° C. to 150° C., followed by treatment of the treated PVC containing particles with $TiCl_4$ at a temperature in the range of 20° C. to 150° C.

22. The catalyst composition of claim 6, wherein the catalyst composition is obtained by treating the PVC containing particles with the mixture of an organomagnesium compound and an organoaluminum compound at a temperature in the range of 20° C. to 150° C., followed by treatment of the PVC containing particles of (a) with $TiCl_4$ at a temperature in the range of 20° C. to 150° C.

23. The catalyst composition of claim 1, wherein the organomagnesium compound is used in an amount such that the ratio of magnesium atoms to titanium atoms in the catalyst composition is 0.1 to 10.

24. The catalyst composition of claim 4, wherein the organoaluminum compound is used in an amount such that the ratio of magnesium atoms to aluminum atoms in the catalyst composition is 0.01 to 2.

25. The catalyst composition of claim 4, wherein the organoaluminum compound is used in an amount such that the ratio of titanium atoms to aluminum atoms in the catalyst composition is 0.1 to 30.

26. The catalyst composition of claim 1, wherein said cocatalyst is an aluminum compound selected from the group consisting of a trialkylaluminum, a dialkylaluminum halide, an alkylalumoxane and mixtures thereof.

27. The catalyst composition of claim 4, wherein said cocatalyst is an aluminum compound selected from the group consisting of a trialkylaluminum, a dialkylaluminum halide, an alkylalumoxane and mixtures thereof.

28. The catalyst composition of claim 26, wherein said trialkylaluminum is triethylaluminum, triisobutylaluminum, tri-n-hexylaluminum or mixtures thereof.

29. The catalyst composition of claim 27, wherein said trialkylaluminum is triethylaluminum, triisobutylaluminum, tri-n-hexylaluminum or mixtures thereof.

* * * * *